RECORD COMPARING READER

Filed Feb. 4, 1955 2 Sheets-Sheet 1

INVENTORS.
FREDERICK M. DEMER &
RALPH G. MORK
BY
Campbell, Brumbaugh, Free & Graves
Their ATTORNEYS.

March 21, 1961 F. M. DEMER ET AL 2,975,965
RECORD COMPARING READER
Filed Feb. 4, 1955 2 Sheets-Sheet 2

INVENTORS
FREDERICK M. DEMER &
RALPH G. MORK
BY
Campbell, Brumbaugh, Free & Graves
their ATTORNEYS.

United States Patent Office 2,975,965

Patented Mar. 21, 1961

2,975,965

RECORD COMPARING READER

Frederick M. Demer, Johnson City, and Ralph G. Mork, Vestal, N.Y., assignors to International Business Machines Corporation, New York, N.Y., a corporation of New York Filed Feb. 4, 1955, Ser. No. 486,166

25 Claims. (Cl. 235—61.7)

This invention relates to apparatus for comparing data bearing records, and has particular reference to such apparatus which produces signals indicative of the compared data.

Comparison of data stored on records serves various functions in accounting machines. For instance, in tabulators the comparison of group designating data on records controls interruption of record feed and initiation of total-taking. In collators, comparison of the stored data controls sorting of the records. In each of these instances, it is necessary to provide a signal to operate various control circuits to perform the desired function. It is evident that the speed and reliability of the comparison function determines, to a great extent, the usefulness of these tabulating machines. Thus, any increase in the comparison rate permits an increase in the number of records that may be accommodated in any particular time interval.

In addition, a comparing record reader, to be most useful, must be capable of serving in existing systems. To lend itself to such systems, it is necessary that the comparison apparatus, in comparing information from records containing data stored at index points arranged in groups, generate signals representative of the relation of the compared data which have the same value as signals generated by prior systems.

Accordingly, it is an object of the present invention to provide apparatus for rapidly and reliably comparing records containing data stored at index points arranged in groups.

It is another object of the invention to provide record comparing apparatus having the above characteristics which generates signals indicative of the compared data.

It is a further object of the invention to provide a reader for comparing records which includes a light storage element cooperating with a synchronized flashing light source.

These and further objects of the invention are accomplished by superimposing images of data containing records to be compared on a light storage target. A beam of electrons scans the target to generate signals indicative of the relation of the data on the records.

In one embodiment of the invention, the projected images coincide on the light sensitive target to provide points illuminated at greater or lesser intensities. These points result in signals indicative of the compared data when scanned by the electron beam.

In another embodiment of the invention, the projected images on the light sensitive target are slightly displaced so that the time and order in which signals are generated by the scanning beam is indicative of the data contained on the compared records.

These and further objects and advantages of the invention will be more readily understood when the following description is read in connection with the accompanying drawings in which.

Figure 1:
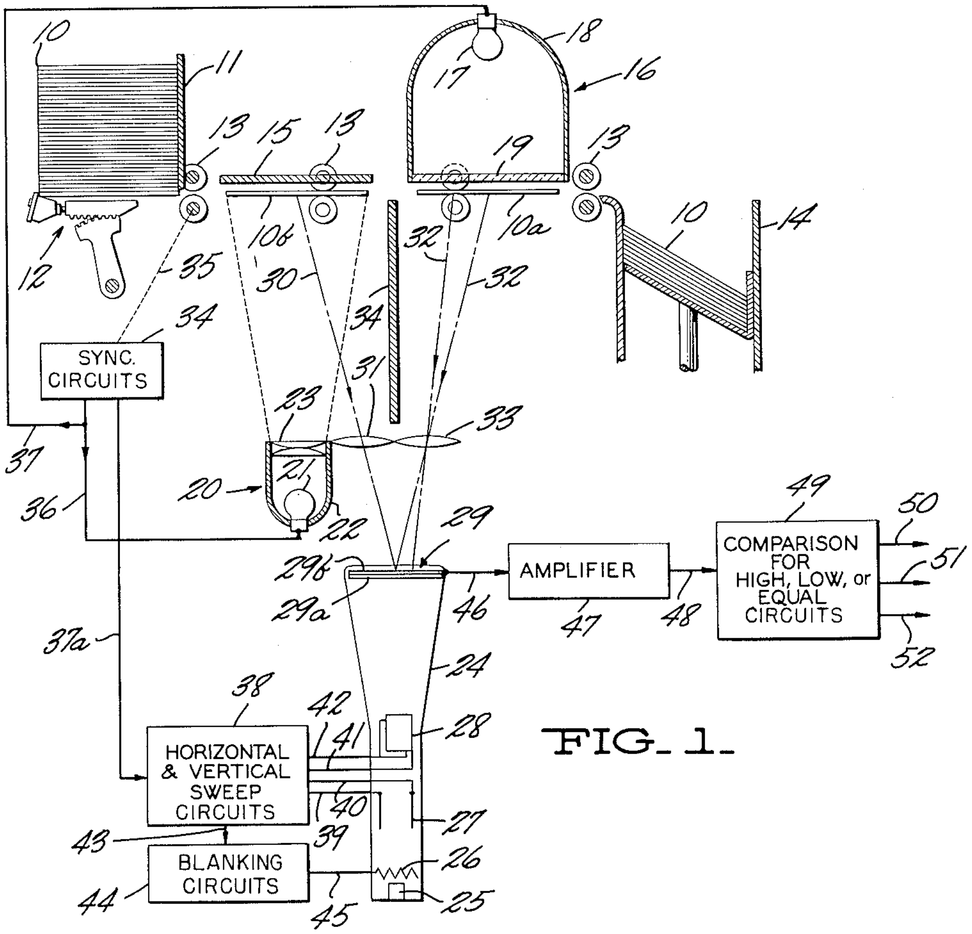
Figure 1 is a schematic diagram in block form of a record comparing reader constructed in accordance with the principles of the present invention.

Referring to an illustrative embodiment of the invention in greater detail with particular reference to Figure 1, data bearing record cards 10 are stacked in a hopper 11. A conventional picker 12 sequentially feeds the cards 10 from the hopper 11 to successive pairs of feed rolls 13. After advancing through the feed rolls 13, the cards 10 are deposited in a delivery hopper 14.

It should be understood that the various circuitry employed to control the card feed system forms no part of the present invention and has, of course, been adequately disclosed in earlier issued patents, for example Patents Nos. 2,364,188 and 2,448,830.

Examining next the light and optical systems employed in the record comparing system, a light absorbing plate 15 is positioned in any desired manner over the path traveled by the cards 10 and adjacent thereto. Also situated over the path of the cards 10 is a light source 16 including a primary source of light rays 17. A reflector 18 encloses the source 17 and directs the resulting light rays to a diffusing plate 19. Preferably, the primary light source 17 comprises a neon lamp or arc light in order to permit the generation of short well defined light flashes.

Positioned on the other side of the path taken by the cards 10 from the light absorber plate 15 and directed thereto is a further light source 20. Preferably, the light source 20 uniformly illuminates the moving cards 10 and to this end, a primary light source 21, preferably comprising a neon lamp or arc light to permit the generation of short well defined light flashes, is enclosed by a reflector 22 directing the light rays through a condenser lens arrangement 23. Obviously, other light sources capable of evenly illuminating the cards 10 may be employed in place of the source 20.

An electron discharge tube 24 includes a conventional electron gun 25, a control or blanking grid 26, vertical and horizontal deflecting plates 27 and 28, respectively, and a light storage screen or target 29. While the tube 24 may comprise any conventional light storage tube such as an iconoscope, orthicon or image orthicon, a vidicon tube is described in connection with the present invention. It is well known that light storage tubes conventionally used, other than the vidicon, operate on the photoemission principle. However, the vidicon employs the photoconductive characteristics of certain materials in order to generate signals representative of a light pattern projected on its photosensitive screen or target. Thus, the target 29 is formed by a layer of photoconductive material **29*a* on a transparent conductive signal plate 29*b*. In the present drawing, the target 29** is shown substantially thicker than it would be in practice in the interests of clarity.

As indicated by a broken line 30, the light rays reflected from a card **10*b* under the light absorbing plate 15 pass through an appropriately positioned lens system, represented by the lens 31, to the light storage target 29. In addition, light rays passing through a card 10*a* positioned beneath the diffusing plate 19, as indicated by a broken line 32, pass through a suitably positioned lens system indicated by the lens 33 and impinge on the light storage target 29. A light baffle plate 34 is disposed between the paths of the light rays 30 and 32** to prevent any interaction between them.

Examining next the control circuits employed in the present system, synchronizing circuits 34 are joined through a conventional mechanical linkage 35 to the driving mechanism for the cards 10, as indicated by the connection of the linkage 35 to one of the pair of feed rolls 13. Cables 36 and 37 join the sync circuits 34 to the primary light sources 21 and 17, respectively, to simultaneously flash them for a predetermined interval when the cards **10*a* and 10*b* are positioned as shown in Figure 1. The sync circuits 34 are also connected by a cable 37*a* to horizontal and vertical sweep circuits 38. Conductors 39, 40 and 41, 42 supply deflecting voltages to the vertical and horizontal deflecting plates 27 and 28, respectively, from the sweep circuits 38. In addition, a cable 43 ties blanking circuits 44 to the sweep circuits 38, a further conductor 45 furnishing signals to the blanking grid 26 from the blanking circuits 44**.

To obtain signals indicative of data compared on the cards **10*a* and 10*b*, a cable 46 is joined to the signal plate 29*b* to supply signals through an amplifier 47 and a cable 48 to comparison for high, low, or equal circuits 49. Three output cables 50, 51 and 52 extend from the comparison circuits 49**.

Examining a typical operation of this embodiment of the invention, the sync circuits 34 are controlled in accordance with the conveying mechanism for the cards 10 to generate electrical pulses on the cables 36 and 37 to flash the primary light sources 21 and 17, respectively. This occurs when the cards **10*a* and 10*b* are positioned directly beneath the light absorbing plate 15 and the light diffusing plate 19**, as shown in Figure 1.

It will be apparent that the light rays from the source 20 will be reflected from the card **10*b* and directed by the lens 31 to the target 29 causing a positive image of this card 10 to appear thereon. On the other hand, the light rays from the source 16 pass through the card 10*a* and are directed by the lens 33 to the target 29 forming a negative image thereon. Suitable adjustment means are provided for the lenses 31 and 33 to permit the positive image of the card 10*b* and the negative image of the card 10*a* to be superimposed in coincidence on the target 29. When this condition is fulfilled, the images of corresponding punched holes on each of the cards 10*a* and 10*b* will be in registry. The intensities of the light sources 16 and 20 are preferably adjusted so that the intensity of illumination on the target 29 produced by the light rays reflected from the card 10*b* is substantially equal to that produced by the light rays passing through a punched hole in the card 10*a***.

Figure 2:
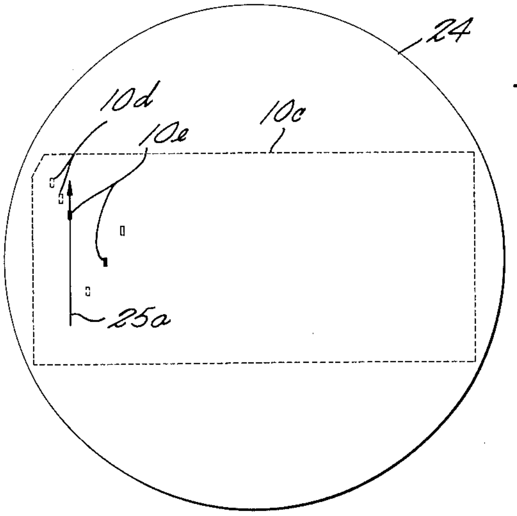
Figure 2 is a plan view, somewhat enlarged, of the face of an electron discharge storage tube employed in the system of Figure 1.

To better understand this action, reference is made to Figure 2 in which an image **10*c* is indicated in broken lines on the face of the vidicon 24. The major portion of the area 10*c* illuminates the target 29 at a constant intensity resulting from the light rays 30 reflected from the card 10*b*. In the event corresponding holes are found in cards 10*a* and 10*b*, light will not be reflected from this index point on the card 10*b* while on the other hand, light rays 32 from the source 16 will pass through such hole in the card 10*a* to supply the same intensity of illumination at this point on the image 10*c* as the light rays 30. Therefore, corresponding holes on the cards 10*a* and 10*b* will not be indicated on the target 29**.

However, if a hole occurs at an index point on the card **10*a* and no hole occurs at a corresponding point on the card 10*b*, the light rays 32 passing through the hole in the card 10*a* will add to the reflected light rays 30 from the card 10*b* to form bright spots as indicated at 10*d*. If the converse is true, i.e., a hole occurs at an index point on the card 10*b* and no hole is found at a corresponding index point on the card 10*a*, dark spots 10*e* will be produced on the target 29 due to the absence of either reflected light from the target 10*b* or light passing through the target 10*a***.

It is apparent, therefore, that three conditions may occur at points on the image **10*c* representing index points on the cards 10*a* and 10*b***. Thus, such points may be moderately illuminated in the case of correspondence and brightly illuminated or not illuminated at all in the event of no correspondence.

In order to produce signals indicative of the illumination of representative points on the target 29, the electron beam in the vidicon tube 24 generated by the gun 25 is swept across paths on the target 29 representative of selected columns of index points on the cards **10*a* and 10*b* as indicated by an arrow 25*a*. To this end, the horizontal and vertical sweep circuits 38 are controlled in accordance with the sync circuits 34 through the cable 37*a*. Therefore, when the light sources 16 and 20 are flashed, the scan of the electron beam is initiated. Any desired circuit arrangements may be employed to drive the electron beam through a predetermined scan pattern on the target 29. For example, the circuitry employed in our copending application Serial No. 486,094, filed February 4, 1955, for "Record Reader," now Patent No. 2,939,632, may be used in the present system to cause the electron beam to scan selected paths representative of selected columns of index points on the cards 10*a* and 10*b***.

The blanking circuits 44 generate signals in response to the sweep voltages generated by the circuits 38 in order to appropriately blank the electron beam during its retrace cycle. This precludes the generation of spurious signals.

When the electron beam in the tube 24 is swept across selected paths on the target 29, signals will be generated on the signal plate **29*b* and applied through the cable 46 to the amplifier 47. In crossing points on the target 29 moderately illuminated due to corresponding holes being found in the cards 10*a* and 10*b*, there will be no change in the output on the cable 46 to the amplifier 47 since these points are illuminated at the same intensity as the remainder of the image 10*c*. This signal output may thus be considered a reference level and when such reference level signal is supplied through the cable 48 to the comparison circuits 49, the output cable 50** may be energized.

Assuming next that the electron beam in scanning the image **10*c* on the target 29 encounters a highly illuminated point 10*d*, the signal supplied through the cable 46 to the amplifier 47 will cause its output to rise above the reference level. Thus, this signal may be considered one of positive polarity with respect to the reference signal and it causes the comparison circuits 49 to energize the output cable 51. This indicates a hole in the card 10*a* without a corresponding hole being found in the card 10*b***.

Finally, when the electron beam encounters a hole image **10*d* of low illumination, the signal output will fall below the reference level and may be considered a signal of negative polarity. When supplied to the comparison circuits 49, this negative signal causes energization of the cable 52 to indicate the occurrence of a hole in card 10*b* without a corresponding hole in the card 10*a***.

If desired, reference pulses may be generated in accordance with the sweep circuits in order to provide a time reference for the output signals found on the cables 50, 51 and 52. Such reference pulses may be generated in accordance with the disclosures found in our copending application Serial No. 524,874, filed July 8, 1955, for "Electronic Record Reader," now Patent No. 2,924,380.

In the operation of this embodiment of the invention, it will be understood that the light sources 16 and 20 flash for intervals of sufficiently short duration to preclude excessive movement of the images of the cards **10*a* and 10*b* on the target 29**. Obviously, a small amount of movement will not interfere with accurate comparison of the data contained on these cards.

The system illustrated in Figure 1 discloses one manner in which the positive and negative images from the cards 10*a* and 10*b*, respectively, may be superimposed on the target 29. Obviously, other equivalent optical systems may be employed to perform this function, the invention not being limited to the specific arrangement illustrated and described in connection with Figure 1.

Figure 3:
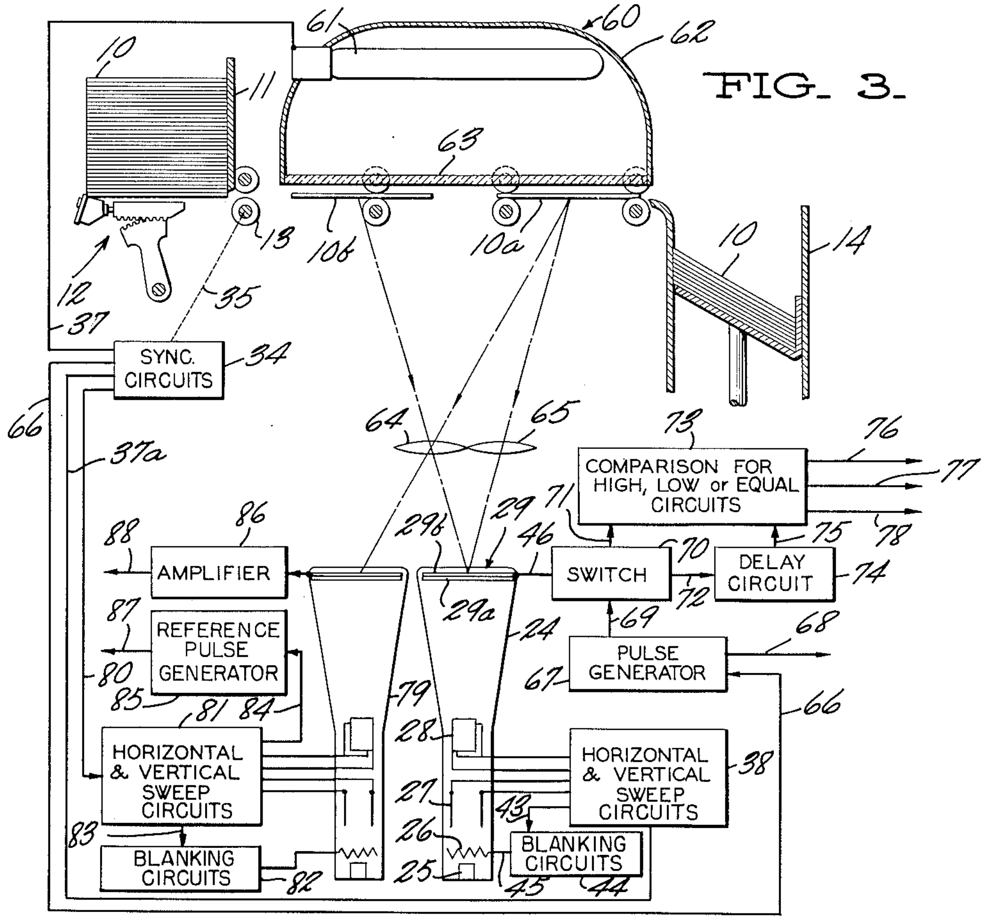
Figure 3 is a modified form of record comparing system in accordance with the present invention.
Figure 4:
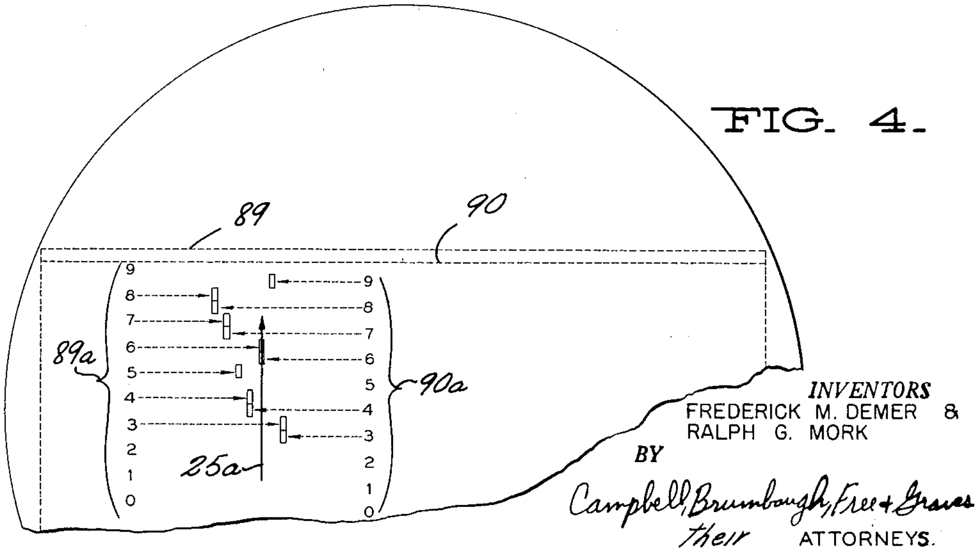
Figure 4 is a plan view, greatly enlarged, of a portion of the face of one of the electron discharge storage tubes employed in the system of Figure 3.

A modified form of record comparing system is illustrated in Figures 3 and 4 and in this embodiment of the invention, elements similar to those found in Figure 1 are designated by like reference numerals. Positioned over the path traveled by the cards 10 is a light source 60 including a primary source of light rays 61 enclosed by a reflector 62, the resultant light rays being directed through a diffusing plate 63 directly above the two data bearing cards 10*a* and 10*b*. The images of the cards 10*a* and 10*b* are projected through lens systems represented by lenses 64 and 65, respectively, to the target 29 of the vidicon tube 24.

Certain circuits, in addition to those found in the system of Figure 1, cooperate with the vidicon 24. Thus, a cable 66 joins the sync circuits 34 to a pulse generator 67 controlling, through a cable 68, a switch 69 receiving signals from the target 29 on the cable 46. The signals supplied to the switch 70 by the cable 46 are alternately applied through cables 71 and 72 to a comparison for high, low, or equal circuits 73 and a delay circuit 74, respectively. The output of the delay circuit is furnished through the cable 75 to the comparison circuits 73 which carry three output cables 76, 77 and 78.

If desired, an additional vidicon tube 79, similar to the tube 24, may be positioned to receive an image of the card 10*a* through the lens 64. A cable 80 from the sync circuits 34 controls horizontal and vertical sweep circuits 81 which supply deflecting voltages to the tube 79 in a manner similar to that described in connection with the sweep circuits 38. In addition, the sweep circuits 81 feed signals to blanking circuits 82 through a cable 83 to effect control of the electron beam in the tube 79 as described in connection with the tube 24. The sweep circuits may also be joined by a cable 84 to a reference pulse generator 85 to generate pulses that may be fed into conventional tabulating machines with signals from an amplifier 86, generated in the vidicon 79, through cables 87 and 88, respectively.

In a typical operation of this embodiment of the invention, the lens systems 64 and 65 are adjusted to superimpose the images of the cards 10*a* and 10*b*, produced by flashing the light source 61, upon the target 29, as shown in Figure 4. One edge of the image of the card 10*a* is represented by a broken line 89 while a corresponding edge of the image of card 10*b* is represented by a broken line 90. Brackets 89*a* and 90*a* enclose numerals 0 to 9, inclusive, designating the vertical position of index points on the cards 10*a* and 10*b*, respectively. The arrows leading from such numerals extend to images of punched holes found at index points on the cards 10*a* and 10*b*, the relationship of corresponding holes being clearly indicated.

The superimposed images 89 and 90 of the cards 10*a* and 10*b*, respectively, are scanned in the same manner as discussed in connection with the embodiment of the invention shown in Figure 1. It will be apparent that due to the registry of one pair of edges of the images 89 and 90, the scanning beam will progress along a path on the target 29 representative of the same columns on the cards 10*a* and 10*b*. Thus, the scanning beam generated by the electron gun 25 scans along a path as indicated by the arrow 25*a* to encounter adjacent hole images representative of corresponding holes on the cards 10*a* and 10*b*.

As clearly evident from Figure 4, the electron beam first encounters an image of hole 6 on the card 10*b* and subsequently encounters an image of hole 6 on the card 10*a*. Of course, this order may be reversed by suitable adjustment of the lenses 64 and 65. Pulses supplied on the cable 66 to the pulse generator 67 from the sync circuits 34 result in the production of further pulses fed through the cable 69 to alternately switch the output signals appearing on the cable 46 from the target 29 to the output cable 71 or the output cable 72.

The operation of the switch 70 is synchronized with the sweep of the electron beam across the target 29, since the sync circuits 34 also control the sweep circuits 38, so that when such beam encounters or passes over a position on the target 29 representative of an index point on the card 10*a*, the signal on the cable 46 will be switched to the cable 71. On the other hand, when the electron beam passes over a position on the target 29 representative of an index point on the card 10*b*, the signal on the cable 46 will be switched to the cable 72.

In other words, the switch 70 is operated to supply signals from the cable 46 to the cable 72 when the electron beam in the tube 24 is passing over points on the target 29 representative of index points on the card 10*b* and to supply such signals to the cable 71 when the electron beam is passing over points on the target 29 representative of index points on the card 10*a*. The signals on the cable 72 are delayed by the delay circuit 74 for a time interval determined by the time it takes the electron beam to pass over a point representative of an index point on the card 10*b*.

In view of the above, it will be evident that when the electron beam is scanned along the path represented by the arrow 25*a* it sequentially encounters images representative of punched holes in the cards 10*b* and 10*a* to generate two signals. The first signal, representative of the image of hole 6 on the card 10*b*, will be switched to the delay circuit 74 and the second signal, representative of the image of hole 6 on the card 10*a*, will be switched to the cable 71. At the time such second signal is switched to the cable 71, the delay circuit will apply a similar signal through the cable 75 to the comparison for high, low or equal circuits 73. Thus, since these signals are applied to the circuits 73 simultaneously, the output conductor 76 will be energized to indicate that correspondence between the cards 10*a* and 10*b* has been found. The signal output on the cable 76 may be combined with the signal on the cable 68 which acts as a reference pulse.

On the other hand, if the electron beam encounters only an image representative of a punched hole in the card 10*b*, the signal will be furnished through the switch 70, the cable 72, the delay circuit 74 and the cable 75 to the comparison circuit 73. As a result, the output cable 77 will be energized to indicate that the information on the cards 10*a* and 10*b* does not correspond at this point. It should also be noted that the sense of such discrepancy is indicated and for example, this may be termed a high discrepancy. If the electron beam encounters only an image representative of a punched hole in the card 10*a*, the resulting signal will be supplied through the switch 70 and the cable 71 to the comparison circuits 73 to energize the output cable 78. Accordingly, this may be termed a low indication thus clearly indicating the sign or sense of the discrepancy between the data appearing on the cards 10*a* and 10*b*.

If another operation such as a reading operation must be conducted on the cards 10, the light rays directed by the lens 64 to the vidicon 79 form an image that may be scanned in order to generate signals representative of the data on the cards 10, as disclosed in our copending application Serial No. 486,094, filed February 4, 1955, for "Record Reader." Thus, the signals may be amplified by the amplifier 86 and supplied to suitable tabulating circuits by an output cable 88 together with reference pulses on the cable 87, generated in the reference pulse generator 85.

While it is preferable to project images on the target 29 by means of flashing light sources synchronized with the card feeding mechanism, it is apparent that the images may be made to remain stationary on the target 29 in the embodiments of the invention shown in Figures 1 and 3 by moving the lenses along the line of card motion while tilting them through the use of cams. Of course, the light sources may be suitably modified by their extension a long the path of card travel in this instance.

Although the invention has been described with reference to record cards, it will be apparent that other data storage records may be used within the scope of the invention. Further, it will be understood that the above-described embodiments of the invention are illustrative only and modifications therof will occur to those skilled in the art. Therefore, the invention is not to be limited to the specific apparatus disclosed herein but is to be defined by the appended claims.

We claim:

1. In apparatus for comparing data stored at index points on records, means for focusing an electron beam on a light storage target, light ray generating means, means to convey the records into the path of the light rays to provide images thereof, means for superimposing the images representative of two of said records on said target, and means for scanning said images with said electron beam to generate signals indicative of the comparison between the data stored on said two records.

2. In apparatus for comparing data stored at index points on records, means for focusing an electron beam on a light storage target, light ray generating means, means to convey the records into the path of the light rays to provide images thereof, means for superimposing the images representative of two of said records on said target, means for scanning said images with said electron beam to generate signals indicative of the comparison between the data stored on said two records, and means responsive to said signals to indicate the relation between the data stored on said two records.

3. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing images on said target formed by the light flashes and representative of two of said records, and means for scanning said images with said electron beam to generate signals indicative of the comparison between the data stored on said two records.

4. Apparatus as defined in claim 3 in which means responsive to said signals are provided to indicate the relation between the data stored on said two records.

5. In apparatus for comparing data stored at index points on records, means for focusing an electron beam on a light storage target, light ray generating means, means to convey the records into the path of the light rays to provide images thereof, means for superimposing the images representative of two of said records in coincident relation on said target, and means for scanning said images with said electron beam to generate signals indicative of the comparison between the data stored on said two records.

6. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing in coincident relation on said target images formed by the light flashes and representative of two of said records, and means for scanning said images with said electron beam to generate signals indicative of the comparison between the data stored on said two records.

7. In apparatus for comparing data stored at index points on records, means for focusing an electron beam on a light storage target, means for superimposing in coincident relation on said target a positive image of a first of said records and a negative image of a second of said records, and means for scanning said images with said electron beam to generate signals indicative of the comparison between the data stored on said first and second records.

8. In apparatus for comparing data stored at index points on records, means for focusing an electron beam on a light storage target, means for superimposing in coincident relation on said target a positive image of a first of said records and a negative image of a second of said records, means for scanning said images with said electron beam to generate signals indicative of the comparison between the data stored on said first and second records, and means responsive to said signals to indicate the relation between the data stored on said first and second records.

9. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing in coincident relation on said target a positive image of a first of said records and a negative image of a second of said records formed by the light flashes, and means for scanning said images with said electron beam to generate signals indicative of the comparison between the data stored on said first and second records.

10. Apparatus as defined in claim 9 in which means responsive to said signals to indicate the relation between the data stored on said first and second records are provided.

11. In apparatus for comparing data stored at index points on records, means for focusing an electron beam on a light storage target, means for superimposing in coincident relation on said target a positive image of a first of said records and a negative image of a second of said records to form points on said target representative of index points on said first and second records illuminated at moderate, high and low intensities if the data at said index points corresponds, occurs solely on the second record, and occurs solely on the first record, respectively, and means for scanning said images with said electron beam to generate three different signals corresponding to the moderate, high and low intensity points, respectively.

12. In apparatus for comparing data stored at index points on records, means for focusing an electron beam on a light storage target, means for superimposing in coincident relation on said target a positive image of a first of said records and a negative image of a second of said records to form points on said target representative of index points on said first and second records illuminated at moderate, high and low intensities if the data at said index points corresponds, occurs solely on the second record, and occurs solely on the first round, respectively, means for scanning said images with said electron beam to generate three different signals corresponding to the moderate, high and low intensity points, respectively, and means responsive to said three signals to indicate the relation between the data stored on said first and second records.

13. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing in coincident relation on said target a positive image of a first of said records and a negative image of a second of said records formed by the light flashes to provide points on said target representative of index points on said first and second records illuminated at moderate, high and low intensities if the data at said index points corresponds, occurs solely on the second record, and occurs solely on the first record, respectively, and means for scanning said images with said electron beam to generate three different signals corresponding to the moderate, high, and low intensity points, respectively.

14. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing in coincident relation on said target a positive image of a first of said records and a negative image of a second of said records formed by the light flashes to provide points on said target representative of index points on said first and second records illuminated at moderate, high and low intensities if the data at said index points corresponds, occurs solely on the second record, and occurs solely on the first record, respectively, means for scanning said images with said electron beam to generate three different signals corresponding to the moderate, high and low intensity points, respectively, and means responsive to said three signals to indicate the relation between the data stored on said first and second records.

15. In apparatus for comparing data stored at index points on records, means for focusing an electron beam on a light storage target, light ray generating means, means to convey the records into the path of the light rays to provide images thereof, means for superimposing the images representative of two of said records in displaced relation on said target, and means for scanning said images with said electron beam to generate signals indicative of the comparison between the data stored on said two records.

16. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing in displaced relation on said target images formed by the light flashes and representative of two of said records, and means for scanning said images with said electron beam to generate signals indicative of the comparison between the data stored on said two records.

17. Apparatus as defined in claim 16 in which means responsive to said signals to indicate the relation between the data stored on said two records are provided.

18. In apparatus for comparing data stored at index points on records, means for focusing an electron beam on a light storage target, means for superimposing images representative of two of said records in displaced relation on said target, means for scanning said images with said electron beam to generate signals, the images being displaced in the scan direction of said beam to locate points on said target representative of corresponding index points on said two records contiguous to each other, and means responsive to the signals to indicate the relation of the data stored on said two records.

19. In apparatus for comparing data stored at index points on records, means for focusing an electron beam on a light storage target, means for sequentially conveying the data bearing records along a path, means for producing flashes of light rays synchronized with the said conveying means and directed toward said path, means for superimposing in displaced relation on said target images formed by the light flashes and representative of two of said records, means for scanning said images with said electron beam to generate signals, the images being displaced in the scan direction of said beam to locate points on said target representative of corresponding index points on said records contiguous to each other, and means responsive to the signals to indicate the relation of the data stored on said two records.

20. In apparatus for comparing data stored at index points on records, means for focusing an electron beam on a light storage target, means for superimposing images representative of a first and a second of said records in displaced relation on said target, means for scanning said images with said electron beam, the images being displaced in the scan direction to locate points on said target representative of corresponding index points on said first and second records contiguous to each other, said electron beam generating first signals when it scans contiguous points representative of data bearing index points on said records, said electron beam generating second signals when it scans contiguous points representative of a data bearing index point on the first record and an index point on the second record, said electron beam generating third signals when it scans contiguous points representative of a data bearing index point on the second record and an index point on the first record.

21. Apparatus as defined in claim 20 in which means responsive to said first, second and third signals are provided to indicate the relation of the data stored on said two records.

22. Apparatus as defined in claim 21 in which control means are provided to operate said signal responsive means in accordance with the scanning means.

23. In apparatus for comparing data stored at index points on records, means for focusing an electron beam on a light storage target, means for sequentially conveying the data bearing records along a path, means for producing flashes of light rays synchronized with said conveying means and directed toward said path, means for superimposing in displaced relation on said target images formed by the light flashes and representative of a first and a second of said records, means for scanning said images with said electron beam, the images being displaced in the scan direction to locate points on said target representative of corresponding index points on said first and second records contiguous to each other, said electron beam generating first signals when it scans contiguous points representative of data bearing index points on said records, said electron beam generating second signals when it scans contiguous points representative of a data bearing index point on the first record and an index point on the second record, said electron beam generating third signals when it scans contiguous points representative of a data bearing index point on the second record and an index point on the first record.

24. Apparatus as defined in claim 23 in which means responsive to said first, second and third signals are provided to indicate the relation of the data stored on said two records.

25. Apparatus as defined in claim 24 in which control means are provided to operate said signal responsive means in accordance with the scanning means.

References Cited in the file of this patent

UNITED STATES PATENTS

| | | |
|---|---|---|
| 2,501,791 | Silverman | Mar. 28, 1950 |
| 2,521,635 | Kornei | Sept. 5, 1950 |
| 2,566,509 | Albright | Sept. 4, 1951 |
| 2,626,989 | Brown | Jan. 27, 1953 |
| 2,712,898 | Knutsen | July 12, 1955 |
| 2,742,631 | Rajchman et al. | Apr. 17, 1956 |
| 2,757,865 | Toulon | Aug. 7, 1956 |

UNITED STATES PATENT OFFICE
CERTIFICATION OF CORRECTION

Patent No. 2,975,965 March 21, 1961

Frederick M. Demer et al.

It is hereby certified that error appears in the above numbered patent requiring correction and that the said Letters Patent should read as corrected below.

Column 4, line 65, for "July 8, 1955" read -- July 28, 1955 --; column 7, line 5, for "a long" read -- along --; line 11, for "therof" read -- thereof --; column 8, line 56, for "round" read -- record --.

Signed and sealed this 8th day of August 1961.

(SEAL)
Attest:

ERNEST W. SWIDER
Attesting Officer

DAVID L. LADD
Commissioner of Patents